Patented Dec. 8, 1931

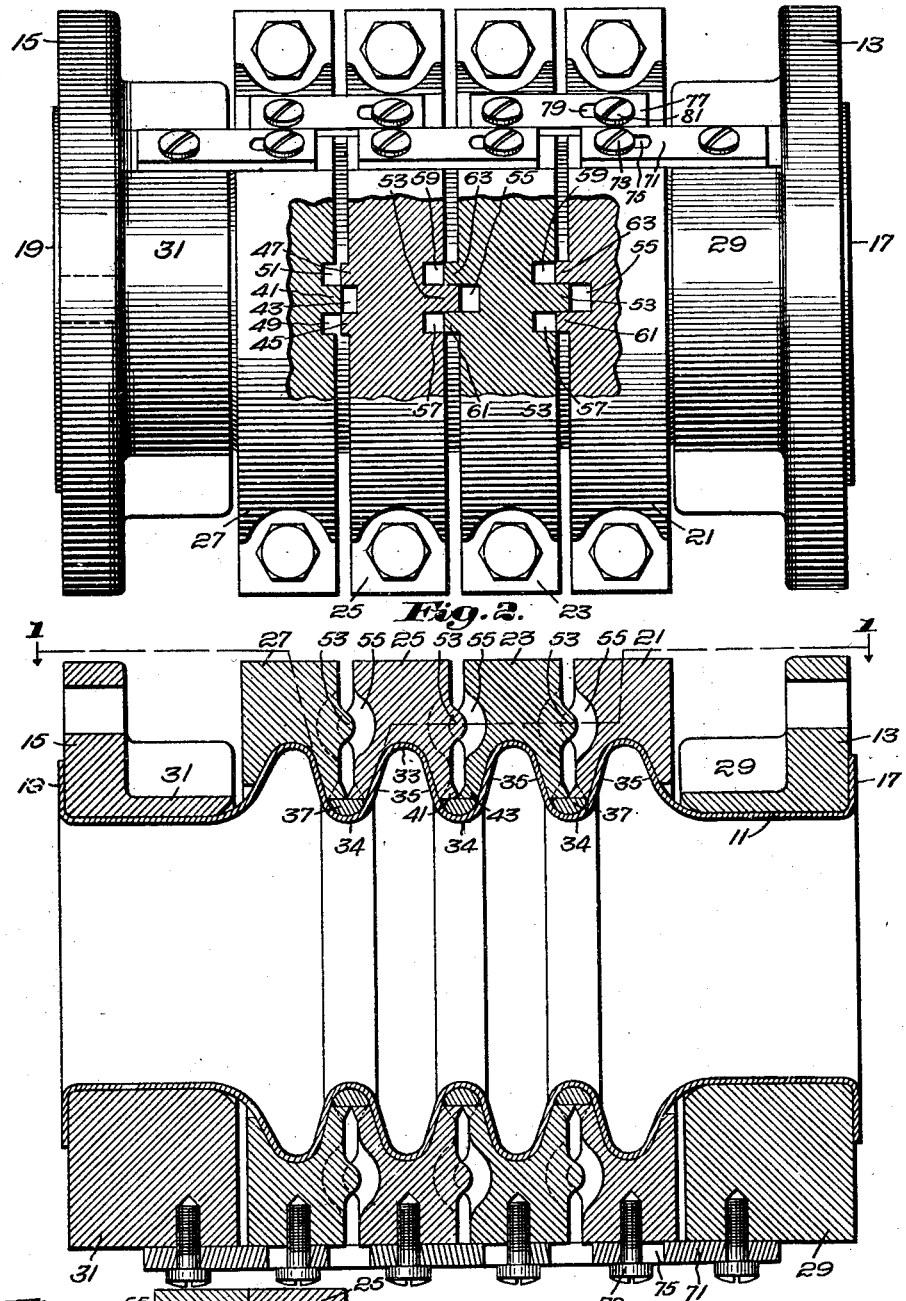

1,835,298

UNITED STATES PATENT OFFICE

CHARLES E. GREENE, OF WINCHESTER, MASSACHUSETTS, ASSIGNOR TO E. B. BADGER & SONS COMPANY, OF BOSTON, MASSACHUSETTS, A CORPORATION OF MASSACHUSETTS

EXPANSION JOINT AND METHOD OF REENFORCING THE SAME

Application filed December 30, 1926. Serial No. 158,113.

This invention relates to expansion joints and methods of reenforcing the same, and particularly to those where the expansion member of the joint comprises a circumferentially corrugated metallic sleeve, and consists in improvements intended to render such joints more serviceable, efficient and lasting.

The invention will be best understood by reference to the following description when taken in connection with the accompanying illustration of one specific embodiment thereof, while its scope will be more particularly pointed out in the appended claims.

In the drawings:

Fig. 1 is a plan view, partly in section, showing an expansion joint embodying one form of the invention, the section being taken on the line 1—1 in Fig. 2;

Fig. 2 is a sectional, longitudinal, central elevation showing the parts of the joint illustrated in Fig. 1, the joint being shown in expanded relation; and Fig. 3 is a detail in section showing a portion of the joint in contracted relation.

Referring to the drawings and to the illustrative form of the invention therein shown, the expansion member of the joint is in the form of a metallic tubular conduit 11 provided with one or more corrugations or circumferential enlargements so as to provide a member capable of longitudinal expansion and contraction, or movement in the direction of its axial length. The joint may be formed with any number of such corrugations, according to the service to which it is to be applied, but herein for illustration it is shown as provided with four circumferential ridges having three intermediate grooves or depressions. The expansion member is in the form of a continuous corrugated metallic sleeve, preferably, though not necessarily, of copper or other non-ferrous metal to enable it best to undergo repeated expansions and contractions without deterioration.

The end portions of the expansion member of the joint may be secured in any desired manner to the adjacent sections of the pipe line to form a fluid tight conduit, but herein the usual method is illustrated which comprises fastening the end portions to the rings or flanges 13 and 15 which are adapted to be bolted to the flanges of the ends of the adjoining pipe line sections, so as to clamp between them the flanged ends 17 and 19 of the metallic sleeve.

The illustrative form of expansion joint is further provided with external, closely fitting, circumferential reenforcing members in the form of rings 21, 23, 25 and 27 engaging the outer walls of the sleeve and separable and independently movable with the expansion and contraction of the sleeve. Each ring, for convenience in assemblage, is composed of two halves bolted together and is provided with side walls adapted to abut against each other when the joint is contracted (as indicated in Fig. 3) but to separate (as indicated in Fig. 2) when the joint is expanded.

The end rings 21 and 27 have their side walls in cooperative relation to end-limiting or abutment members 29 and 31 respectively which are formed on the end flanges 13 and 15 so that the end rings 21 and 27 approach and recede from the limiting abutments 29 and 31 with the contraction and expansion of the joint. The opposite sides of the several reenforcing rings and the opposed sides of the end rings and limiting abutments are spaced at such a distance as to permit the desired movement of the contraction and separation. During the contraction of the joint, when any one of its corrugations has flexed to the maximum extent desired, the edges of the adjoining rings contact with each other and prevent further contraction at that point. This requires further contraction of the joint to be provided by a further flexing at the remaining corrugations. When contact has been made between the end rings and the end abutments and between the intermediate adjoining rings, a rigid, non-compressible structure results, preventing further contraction of the joint. The reenforcing devices, accordingly, limit the contracting movement of the sleeve and tend to equalize the flexing at the several corrugations thereof.

In the disclosed embodiment of the invention a novel relationship is provided between the reenforcing rings and the corrugations of the sleeve which has an important effect on the strength, durability and efficiency of the joint.

Referring to Figs. 2 and 3 of the drawings, it will be observed that the reenforcing rings are each formed to provide an internal, circumferential bearing groove of concaved cross section, so that they engage and fit over the outer convex arched walls 33 of the corrugations, or, in other words, rest in close fitting relation on the ridges of the corrugations, the planes of separation between the rings occurring in approximate coincidence with the depressions or grooves 34 of the corrugations. Furthermore, the reenforcing walls of each ring are extended down on each side of the convex arch or ridge of the corrugation and are so shaped that when the joint is expanded they fit closely over and confine the side walls 35, 35 of each corrugation. In the form shown in the drawings, the support afforded by the reenforcing rings to the side walls under the conditions of expansion extends down almost to the point where the shape of the sleeve changes to a concave formation and the groove begins. When the joint contracts, flexure takes place at the opposite ends of the convex arch 33 and (as shown in Fig. 3) the side walls 35 separate or withdraw more or less from the side walls of the grooved reenforcing ring, but the bottom of the groove of the reenforcing ring still retains its close fitting seating relation over the walls of the outer convex arch itself.

In order to limit the contraction to which the joint may be subjected at any given corrugation thereof, and to equalize the contractions between successive corrugations, it has been the practice heretofore to employ external reenforcing rings circumferentially engaging the sleeve only between the corrugations or at the grooves 34 thereof, such rings being independently movable and adapted to be separated by the elongation of the sleeve but to be brought into abutment on the contraction thereof through the action of limiting members fixed at opposite ends of the joint. The primary object of such reenforcing rings is to prevent excessive contraction of any one portion of the sleeve, although they also provide through their engagement a certain measure of external reenforcement against the failure of the sleeve under internal pressure, such external reenforcement, however, being localized at the bottom of the groove between successive ridges of the corrugations.

In practice, however, it is seldom that expansion joints reenforced as described fail under collapse from internal pressure. Their failure is almost invariably due to breakage from fatigue of the metal, or a loss of its capacity to flex under repeated contractions and expansions. Furthermore, the failure of these joints from this cause usually occurs at or near the bend on one side or the other of what, for distinction, may be termed the inner concave arches 34 of the corrugations, and seldom or never in what may be termed the outer convex arched walls or the ridges 33 of the corrugations.

This fact indicates that the inner concave arched portions 34 and the outer convex arched portions 33 of the corrugations are being subjected to unequal amounts of flexing, and this I have ascertained is due in some substantial measure to the fact that, under continued usage, the outer convex arched portions, being unsupported by any external reenforcement, tend to bulge outwardly and laterally, this acting to flatten and stiffen the arch 33 so that the corrugations at that point tend gradually to lose the capacity to flex, throwing an increasing amount of the bending action on the walls of the inner concave arch 34 and leading to an unnecessarily early failure thereat.

The disclosed construction accordingly provides means whereby external circumferential reenforcement is provided for the outer convex arch-shaped walls 33 of the corrugations, or, in other words, for the ridges thereof, the effect of such reenforcement preferably being to so confine the arch-shaped walls of the ridges that they continue to maintain their original shape and the joint continues to function without deformation. The outer arches 33 thereby retain their initial flexibility and cause both the inner and outer arches to contribute equally to the expansion and contraction, so that there is secured the full movement of the joint with a minimum amount of flexing at each arch thereof and a maximum durability and life for the joint.

Such reenforcement also provides the most effective resistance to internal pressure since the outer arch is subjected to pressure from within, or from the concave side of its curvilinear body, and, being more susceptible to a collapse which might result from an outward bulging, has a greater tendency to deform than has the inner arch, which latter is subjected to internal pressure from the convex side of its curvilinear body or from a direction in which it is more capable of resisting the stress.

Since the outer arches, therefore, are more susceptible to pressure from within the pipe line, and these, through the use of the herein described invention, are externally reinforced under all conditions of service, the corrugated sleeve itself, while capable of withstanding the same amount of pressure, may be made of thinner copper than a sleeve which is reinforced merely at the inner arches, or at the grooves between the ridges of the corrugations, as heretofore.

Since the life of a corrugated joint, as measured by its continued capacity to withstand repeated longitudinal expansions and contractions, is greatly increased by reducing the thickness of the metal, the method of reenforcement herein described permits the same internal pressure to be withstood through the use of a thinner metallic sleeve, and thereby increases the life or durability of the joint from that cause, as well as from equalizing the flexing at the inner and outer arches.

The reenforcing rings engaging the ridges of the corrugations may be employed as described and without other or additional reenforcement. Herein, however, I have provided intermediate circumferential reenforcing members 37 externally engaging the grooved portions 34 of the corrugations intermediate the ridge portions. The reenforcing members 37 may be of the form of metallic rings, split into halves and doweled together if desired. These are formed so as to closely fit the concave arches of the three grooves or depressions when the joint is in its expanded condition, as shown in Fig. 2.

The ring 37, snugly fitting the groove on the concave side of the arch 34, is constructed to receive support from the larger reenforcing rings 21, 23, etc., and for this purpose has its outer periphery shaped to provide a bearing seat 39 for the contacting walls of each overlying outer ring. As the joint expands and contracts, therefore, the outer rings slide over the seat thus provided by the exterior surface of the inner ring and reenforce it against pressure from within which might tend to deform the sleeve at the convex arch 34. Through its closely fitting relation it also preserves the intended, designed geometrical form of the arch.

In some cases, due to the size of the joint, the shape of the corrugations and the amount of expansion and contraction which must be provided for, there may be left an insufficient bearing surface between the inner ring 37 and the adjoining outer rings when the joint is expanded. To provide for an adequate bearing under all conditions, one side of two adjoining rings may be provided with a laterally extending bearing foot 41 which will overlie and bear against a substantial part of the inner ring when the joint is expanded, the opposing side of the adjoining ring having a corresponding slot or recess 43 adapted to receive the bearing foot 41 when the joint is contracted. The side bearing the slot 43 may have at either side thereof extended bearing feet 45 and 47 adapted to register with the slots 49 and 51 in the adjoining ring and to enter the same when the joint contracts. This system of interlocking or dove-tailed bearing surfaces may be utilized at one or more points around the periphery of the joint, as, for example, at two locations thereon, 180° apart.

In some instances the amount of expansion required by the joint may call for the withdrawal of the bearing feet on one ring from the cooperating slots on the adjoining ring. Under such circumstances it is requisite that the two adjoining rings remain interlocked so that the necessary alignment will be maintained at all times between the bearing feet on one ring and the cooperating slots on the adjoining ring. I accordingly provide a somewhat similar interlocking, tongue and groove connection but at a greater radial distance on the sides of the rings, the slots and entering tongues of which extend laterally for such a distance that the interlocking connection and consequent alignment are maintained between the rings under all conditions of expansion and contraction.

As shown in the drawings, this tongue and groove connection herein comprises the lateral extension 53 formed on the side of one of the larger reenforcing rings and a cooperative slot 55 on the opposing side of the next adjoining ring, the projection being engaged with the slots in all positions of the joint. At opposite sides of the projection 53 there are formed the slots 57 and 59 which are likewise adapted to receive the projections 61 and 63 carried by the adjoining ring at either side of the slot 55.

With the addition of the extra reenforcement for the concave side of the arch 34 at the groove of the corrugation, it will be seen that the joint is effectively protected against the force of pressure from within at all points where failure might result from that cause, and is also strengthened in such fashion as to tend better to equalize the flexing between the two series of arches, thereby further adding to the efficiency and durability of the joint.

In the illustrative form of expansion joint there is also provided means for not only limiting the total expansion of the joint, but for limiting and equalizing or apportioning the expansion which may take place between successive corrugations thereof, such means accordingly preventing the expansion from proceeding far enough at any one corrugation to cause the closely fitting reenforcing rings to deform the corrugated walls of the sleeve.

For that purpose there is provided one or more (preferably at least two) sets of straps or links associated with the outer periphery of the rings and arranged transversely thereto which limit the opening movement possible between each successive pair of rings and also between the end rings and the adjoining limiting members.

Referring to Figs. 1 and 2, there is bolted or otherwise fixedly secured to an enlargement on the end flange 13 a short plate or strap 71 which overlies the circumferential surface of the adjoining end ring 21 and is connected thereto by a stud 73 which passes through a slot 75 in the strap 71. The slot is elongated, however, so as to permit a limited separating movement of the reenforcing ring from the end limiting member. When this movement is completed, however, the stud 73 engages the end of the slot 75, preventing any further opening movement of the reenforcing ring and preventing further expansion of the joint at that particular point.

To limit the separating movement between the first and second rings of the series, a similar strap 77 is bolted to the first ring at the side of the strap 71 and provided with a slot 79, between which and the stud 81 there is also provided lost motion which limits the amount of separation between the two said reenforcing rings and the amount of expansion which can take place at the intermediate corrugation of the joint.

Successive rings are connected by similar straps or plates which are arranged in staggered relation, as indicated in Fig. 1, the last ring of the series being connected to the end flange 15 to allow limited separation between the end limiting member of the flange 15 and the last reenforcing ring of the series. When the joint is contracted the closing edges of the straps may be in contact or in substantial contact, but when the joint is expanded they separate from each other, allowing the studs to move within the slots as described. The total amount of expansion is limited by the described connections and the expansion of the joint may be equally or otherwise apportioned, as desired, to the successive corrugations of the joint.

While I have herein shown for the purpose of illustration one specific embodiment of the invention, it is to be understood that extensive deviations may be made therefrom and from the details and relative proportions of parts herein illustrated, all without departing from the spirit thereof.

Claims:

1. An expansion joint comprising a peripherally corrugated metal sleeve capable of expansion and contraction, a reeinforcing structure comprising a plurality of separable circumferential reenforcing members each engaging and fitting over the outer convex arched walls of a corrugation when the joint is expanded, said members being provided with abutting walls adapted to be brought together on the contraction of the sleeve but to be separated on expansion thereof, the planes of separation of said members occurring in approximate coincidence with the intermediate grooves between said arched walls and a limiting member secured to the sleeve on each opposite side of said reenforceing members whereby the contraction of the sleeve is limited.

2. An expansion joint comprising a peripherally corrugated metal sleeve capable of expansion and contraction and having a reenforcing structure comprising a plurality of separable reenforcing rings, and end limiting members to limit the contraction of the sleeve, the reenforcing rings when the joint is expanded circumferentially engaging and fitting over the outer convex arched walls of the corrugations and also, when the sleeve is expanded, engaging the side walls of the corrugations between the outer arched and inner arched portions thereof, the planes of separation of said members occurring in approximate coincidence with the said inner arched portions said rings having abutting side portions adapted to be separated when the sleeve is expanded but to be brought into contact when the sleeve is contracted, thereby to limit each contraction.

3. In an expansion joint, the combination with a peripherally corrugated flexible metallic sleeve adapted longitudinally to expand and contract, of a reenforcing structure comprising a plurality of separable reenforcing members having abutting side portions when the sleeve is contracted, said members engaging and fitting over the outer arched ridge portions of the corrugations when the joint is expanded, and separate means also for engaging and reenforcing the sleeve at the grooved portions intermediate said ridge portions.

4. An expansion joint comprising a peripherally corrugated sleeve capable of expansion and contraction and having a reenforcing structure with a plurality of separable circumferential reenforcing members engaging and fitting over the outer ridge portions of the corrugations when the joint is expanded, and separate intermediate circumferential reenforcing members externally engaging the grooved portions of the corrugations intermediate the ridge portions.

5. An expansion joint comprising a peripherally corrugated sleeve capable of longitudinal expansion and contraction and having a reenforcing structure with a plurality of separable reenforcing rings engaging the outer convex arch-shaped walls of the corrugations and movable therewith as the joint expands, and an intermediate external ring engaging the intermediate groove between said corrugations, said first mentioned ring having extended side walls overlying and having sliding engagement with said last mentioned ring.

6. An expansion joint comprising a peripherally corrugated sleeve capable of longitudinal expansion and contraction and having a reenforcing structure with a plurality of separable reenforcing rings engaging the outer convex arch-shaped walls of the corrugations and movable therewith as the joint expands, and an intermediate external ring engaging the intermediate groove between said corrugations, said first mentioned ring having extended side walls overlying and having sliding engagement with said last mentioned ring, the extended walls on the side of one of said separable rings being adapted to enter a corresponding recessed portion on the side walls of the adjoining ring.

7. An expansion joint comprising a peripherally corrugated sleeve capable of longitudinal expansion and contraction and having a reenforcing structure with a plurality of separable reenforcing rings engaging the outer convex arch-shaped walls of the corrugations and movable therewith as the joint expands, an intermediate external ring engaging the intermediate groove between said corrugations, said first mentioned ring having extended side walls overlying and having sliding engagement with said last mentioned ring, the extended walls on the side of one of said separable rings being adapted to enter a corresponding recessed portion on the side walls of the adjoining ring, and means for maintaining the rings in alignment.

8. An expansion joint comprising a peripherally grooved, corrugated sleeve capable of longitudinal expansion and contraction and having a circumferential reenforcing member engaging a groove of said sleeve, and circumferential reenforcing members reenforcing the sleeve in each adjoining ridge portion of the corrugation, said ridge reenforcing members being related to the grooved reenforcing members also to reenforce the latter.

9. An expansion joint comprising a peripherally grooved, corrugated sleeve capable of longitudinal expansion and having a reenforcing structure comprising a pair of separable reenforcing members engaging the sleeve adapted to approach and recede on contraction and expansion of the joint, and an intermediate circumferential reenforcing member also engaging the sleeve, on the exterior surface of which intermediate reenforcing member the said separable members have bearing contact.

10. An expansion joint comprising a peripherally grooved, corrugated sleeve capable of longitudinal expansion and contraction, and a reenforcing structure affording a continuous reenforcement for the sleeve and comprising a series of outer circumferential reenforcing members adapted to move relatively to each other on movement of the joint, and one or more intermediate circumferential reenforcing members confined within said outer members.

11. An expansion joint comprising a peripherally corrugated sleeve capable of longitudinal expansion and contraction and having both the ridges and the grooves of the corrugation reenforced by separate circumferential reenforcing members adapted for relative movement on contraction and expansion of the joint.

12. An expansion joint comprising a peripherally corrugated sleeve capable of expansion and contraction and having a reenforcing structure externally reenforcing the sleeve at both the ridges and the grooves of the corrugations and including a plurality of separable, circumferential, reenforcing members engaging the outer ridge portions of the corrugations, said structure closely fitting the contour of the sleeve when the same is expanded.

13. An expansion joint comprising a peripherally corrugated sleeve capable of expansion and contraction and having a reenforcing structure comprising a plurality of grooved reenforcing rings, and end limiting members coacting therewith to limit the contraction of the sleeve, the grooves of the reenforcing rings being shaped to fit over and have circumferential engagement with the outer ridges of the corrugations and the rings being relatively movable between said outer ridges to provide for expansion.

14. An expansion joint comprising a peripherally corrugated flexible metal sleeve adapted to expand and contract, a reenforcing structure comprising for each corrugation of said flexible metal sleeve a separate reenforcing ring having a concave circumferential bearing groove engaging and fitting over the outer convex arched wall of the corrugation when the joint is expanded, and means cooperating with said reenforcing structure to limit the contraction of the sleeve.

In testimony whereof, I have signed my name to this specification.

CHARLES E. GREENE.